(12) United States Patent
Xu et al.

(10) Patent No.: US 10,936,419 B2
(45) Date of Patent: Mar. 2, 2021

(54) METHOD, DEVICE AND COMPUTER READABLE MEDIUM FOR MANAGING A STORAGE SYSTEM

(71) Applicant: EMC IP Holding Company LLC, Hopkinton, MA (US)

(72) Inventors: Tao Xu, Beijing (CN); Hongpo Gao, Beijing (CN); Jibing Dong, Beijing (CN); Jian Gao, Beijing (CN); Changyu Feng, Beijing (CN); Geng Han, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 174 days.

(21) Appl. No.: 16/172,030

(22) Filed: Oct. 26, 2018

(65) Prior Publication Data
US 2019/0129795 A1 May 2, 2019

(30) Foreign Application Priority Data
Oct. 27, 2017 (CN) .......................... 201711023156.1

(51) Int. Cl.
| G06F 11/00 | (2006.01) |
| G06F 11/10 | (2006.01) |
| G06F 3/06 | (2006.01) |
| G06F 11/20 | (2006.01) |

(52) U.S. Cl.
CPC ........ *G06F 11/1088* (2013.01); *G06F 3/0644* (2013.01); *G06F 3/0653* (2013.01); *G06F 11/2094* (2013.01); *G06F 3/0613* (2013.01); *G06F 3/0619* (2013.01); *G06F 3/0689* (2013.01)

(58) Field of Classification Search
CPC ............ G06F 11/1088; G06F 11/2094; G06F 11/1092; G06F 11/1076; G06F 11/2053; G06F 11/2089; G06F 3/0644; G06F 3/0653; G06F 3/0612; G06F 3/0619; G06F 3/0689
See application file for complete search history.

(56) References Cited

U.S. PATENT DOCUMENTS

| 10,146,624 | B1 | 12/2018 | Gong et al. | |
|---|---|---|---|---|
| 10,210,045 | B1 | 2/2019 | Gao et al. | |
| 10,289,507 | B1* | 5/2019 | Malwankar | ........... G06F 3/0635 |
| 10,365,983 | B1 | 7/2019 | Foley et al. | |
| 10,459,814 | B2 | 10/2019 | Gao et al. | |
| 2013/0073900 | A1* | 3/2013 | Li | ....................... G06F 11/1092 714/6.22 |

\* cited by examiner

*Primary Examiner* — Joseph D Manoskey
(74) *Attorney, Agent, or Firm* — BainwoodHuang

(57) ABSTRACT

Embodiments of the present disclosure provide a method and a device for managing storage system. In an embodiment, a plurality of RAID stripes to be reconstructed in the storage system are determined. A first RAID stripe is selected from a plurality of RAID stripes based on a plurality of I/O load states at a disk extent level for the plurality of RAID stripes at a first storage processor in the storage system, the first RAID having a high I/O load at the disk extent level. Then, a first disk extent for reconstructing the first RAID stripe is determined and the first storage processor is configured to reconstruct data for the first RAID stripe at the first disk extent. A corresponding device to implement the method is further disclosed.

20 Claims, 10 Drawing Sheets

METHOD, DEVICE AND COMPUTER READABLE MEDIUM FOR MANAGING A STORAGE SYSTEM

RELATED APPLICATIONS

This application claim priority from Chinese Patent Application Number CN 201711023156.1, filed on Oct. 27, 2017 at the State Intellectual Property Office, China, titled "METHOD, DEVICE AND COMPUTER READABLE MEDIUM FOR MANAGING STORAGE SYSTEM" the contents of which is herein incorporated by reference in its entirety.

FIELD

Embodiments of the present disclosure generally relate to the field of the data storage technology, and more specifically, to a method, a device and a computer readable medium for managing a storage system.

BACKGROUND

Redundant array of independent disks (RAID) is a virtualization technology for data storage, which combines a plurality of physical disks into a single logic unit to improve data redundancy, reliability and performance. Taking the traditional RAID 5 as an example, RAID 5 includes block-level stripes with distributed parity check. The parity check information is distributed in a plurality of physical disks. Upon occurrence of failure of a single physical disk, the data read subsequently may be calculated based on the distributed parity check so that data will not be lost. Meanwhile, it is possible to select a hot spare physical disk to replace the damaged physical disk. All the data on the damaged physical disk are reconstructed and written into the selected hot spare physical disk.

However, the reconstruction time of the traditional RAID technology is limited by the input/output (I/O) bandwidth of the hot spare physical disk. Therefore, for the traditional RAID technology, the I/O bandwidth of the hot spare physical disk has become a bottleneck, making it difficult for the traditional RAID technology to reduce the reconstruction time, particularly when the storage capacity of the physical disk becomes increasingly large.

SUMMARY

In general, embodiments of the present disclosure provide a solution of storage management for improving reconstruction performance of mapped RAID.

In accordance with a first aspect of the present disclosure, there is provided a method for a storage management system, comprising: determining a plurality of RAID stripes to be reconstructed in the storage system; selecting a first RAID stripe from the plurality of RAID stripes based on a plurality of I/O load states at a disk extent level for the plurality of RAID stripes at a first storage processor in the storage system, the first RAID having a high I/O load at the disk extent level; determining a first disk extent for reconstructing the first RAID stripe; and causing the first storage processor to reconstruct data for the first RAID stripe at the first disk extent.

In some embodiments, the storage system includes a plurality of storage processors, and wherein reconstruction of the first RAID stripe by the first storage processor at the first disk extent is performed concurrently with reconstruction of a second RAID stripe by a second storage processor at a second disk extent.

In some embodiments, selecting the first RAID stripe comprises: selecting, from the plurality of RAID stripes, a first set of RAID stripes having a low I/O load at a disk level at the plurality of storage processors; and selecting the first RAID stripe from the first set of RAID stripes.

In some embodiments, determining the first disk extent comprises: selecting, from a plurality of disks available for reconstructing the first RAID stripe in the storage system, a first set of disks having a low I/O load at the first storage processor; selecting, from the first set of disks, a disk having a high available capacity as a candidate disk for reconstructing the first RAID stripe; and selecting, from the candidate disk, an available disk extent as the first disk extent.

In some embodiments, the method further comprises: determining an allowed concurrent number for reconstructing the plurality of RAID stripes concurrently based on at least one of the following: a current user I/O load, the number of cores in the plurality of storage processors, the number of the plurality of RAID stripes, and the number of disks in the storage system.

In some embodiments, the method further comprises: obtaining an I/O load state at the plurality of storage processors from the plurality of storage processors, the I/O load state including at least one of the following: a plurality of I/O load states at disk level for the plurality of RAID stripes, a plurality of I/O load states at a disk extent level for the plurality of RAID extents, and a plurality of I/O load states for a plurality of disks in the storage system.

In a second aspect of the present disclosure, there is provided an electronic device, comprising: a processor; and a memory coupled with the processor and having instructions stored thereon. The instructions, when executed by the processor, cause the device to perform acts comprising: determining a plurality of RAID stripes to be reconstructed in a storage system; selecting a first RAID stripe from the plurality of RAID stripes based on a plurality of I/O load states at a disk extent level for the plurality of RAID stripes at a first storage processor in the storage system, the first RAID having a high I/O load at the disk extent level; determining a first disk extent for reconstructing the first RAID stripe; and causing the first storage processor to reconstruct data for the first RAID stripe at the first disk extent.

According to a third aspect of the present disclosure, there is provided a computer readable storage medium having computer readable instructions stored thereon, the computer readable instructions, when executed, causing the device to perform the method provided according to the first aspect of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the drawings, the same or similar reference signs represent the same or similar elements, in which.

DETAILED DESCRIPTION OF EMBODIMENTS

Figure 1:
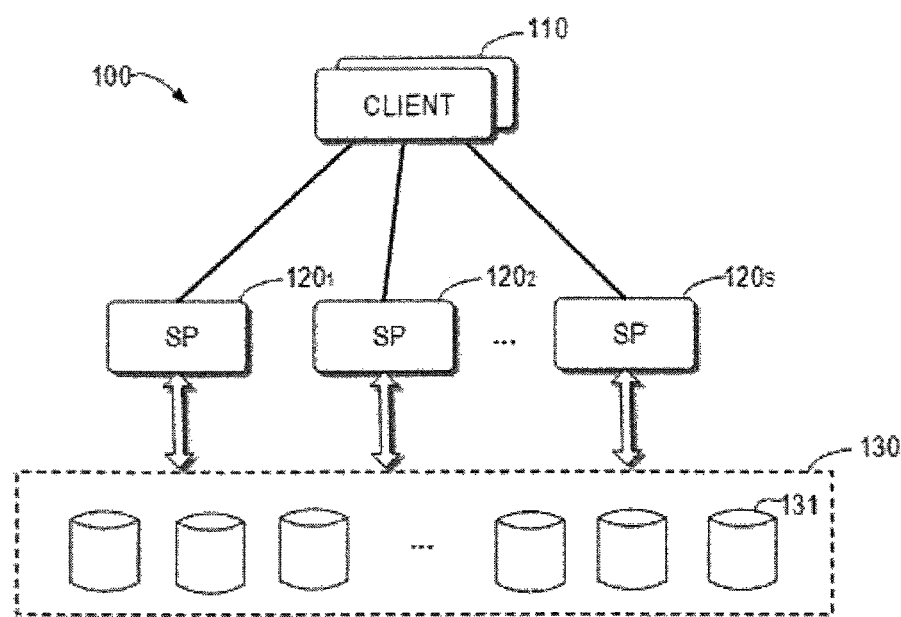
FIG. 1 is a schematic diagram illustrating a storage environment in which embodiments of the present disclosure are applicable.

Embodiments of the present disclosure will now be described with reference to the drawings. It is to be noted that similar parts or functional components may be indicated with the same numbers in the drawings. The appended drawings are merely aimed at illustrating the embodiments of the present disclosure. Without departing from the spirits and scope of protection of the present disclosure, other alternative embodiments can also be obtained by those skilled in the art from the following depiction.

As used herein, the term "includes" and its variants are to be read as open-ended terms that mean "includes, but is not limited to." The term "based on" is to be read as "based at least in part on." The term "an embodiment" is to be read as "at least one embodiment." The term "another embodiment" is to be read as "at least one another embodiment."

FIG. 1 is a storage environment 100 in which embodiments of the present disclosure are applicable. As illustrated, the storage environment 100 includes one or more clients 110, one or more storage processors (abbreviated as "SP") $120_1$, $120_2$, and $120_s$ (collectively referred to as "SP 120") and a storage apparatus 130. There are S SPs in the storage environment 100 shown in the figure. The client 110 may also be any suitable electronic device which can implement storing, obtaining and processing operations for data on the storage apparatus 130 through the storage processor 120.

In the example storage environment 100, there are provided a plurality of storage processors to provide higher reliability for the storage system. In some embodiments of the present disclosure, the storage processors $120_1$, $120_2$, and $120_s$ may be arranged in a single physical device (such as storage server). The client 110 may communicate with any storage processor via a front-end device (for instance, an access component such as a network interface controller and an optical fiber access interface) of a storage server and request its preferred storage processor to provide the desired storage service.

The storage apparatus 130 may include one or more physical storage devices 131. Examples of the physical storage apparatus 130 may include, but not limited to: a solid state disk (SSD), a fiber channel (FC) disk, a serial advanced technology attachment (SATA) disk, a serial attached small computer system interface (SAS) disk and the like. In some embodiments of the present disclosure, mapped RAID technology may be used to configure the physical storage device 131.

In the traditional RAID, when a physical disk fails, the reconstruction process will be triggered. The reconstruction process is generally controlled only by one storage processor. The storage system will select an unused physical disk as a spare disk, read data from other disks in the RAID, and reconstruct data based on the distributed parity check calculation (for instance, through XOR operation) and write the reconstructed data into the spare disk.

As stated above, in the traditional RAID reconstruction process, the I/O bandwidth of the spare disk will become a bottleneck of the reconstruction process. With mapped RAID technology and using a plurality of processing memories for the data reconstruction process, it is expected to improve the data reconstruction performance in the storage environment 100.

Figure 2:
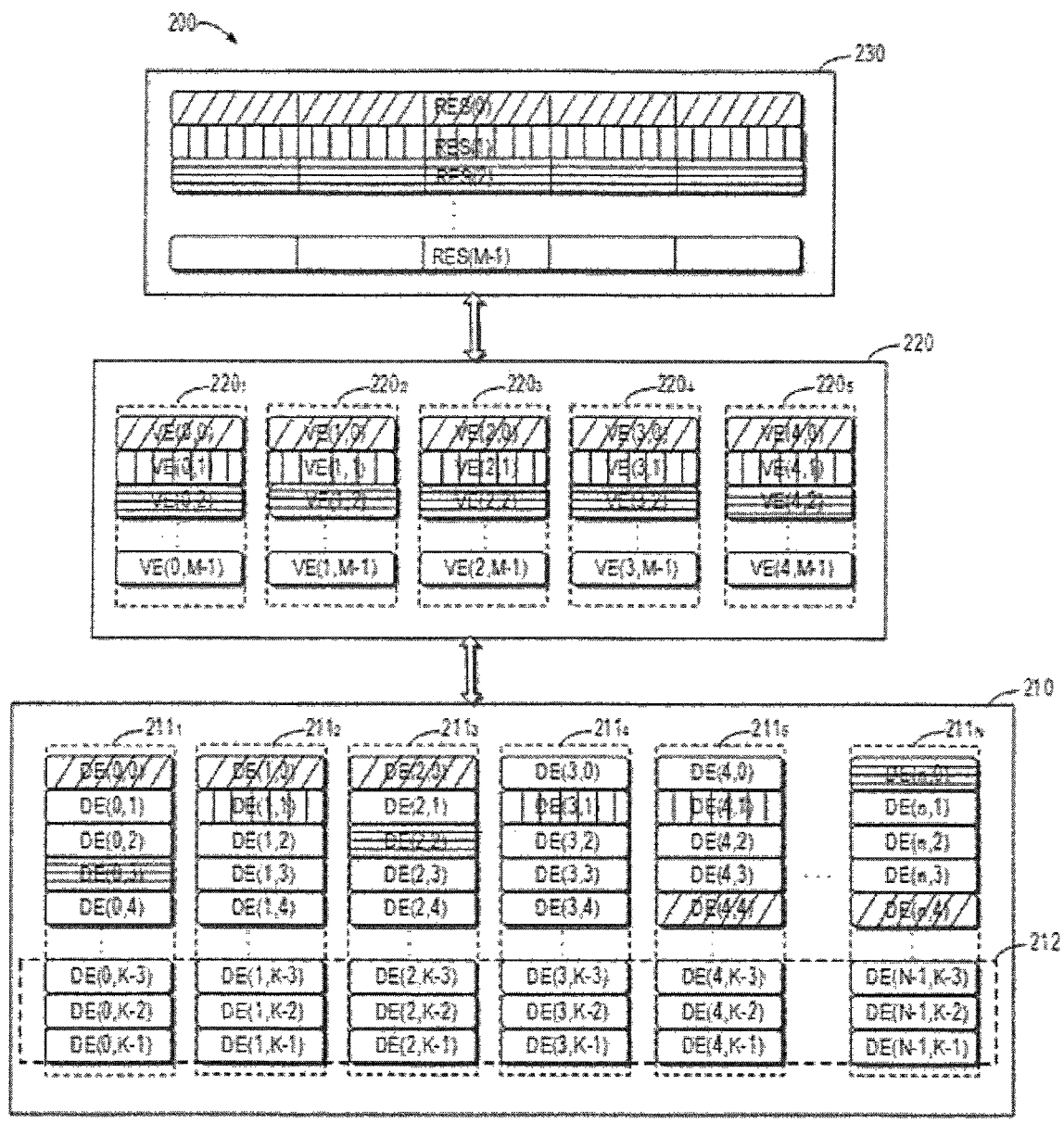
FIG. 2 is a schematic diagram illustrating a logic structure of mapped RAID.

FIG. 2 is a schematic diagram illustrating a logic structure 200 of mapped RAID. The logic structure 200 illustrates a storage pool 210, a virtual disk set 220 and a RAID stripe set 230. The storage pool 210 may consist of N storage disks $211_1$ to $211_N$ (hereinafter collectively referred to as storage disk 211). The storage disk 211, for instance, may be the physical storage device 131. The storage area of each storage disk is divided into a plurality of non-overlapping extents whose size may be fixed generally. In the present disclosure, these extents in the storage pool 210 are referred to as disk extents (DE). For example, the figure shows that each storage disk is divided into K disk extents.

The logic space of the mapped RAID is divided into a plurality of continuous and non-overlapping extents. In the present disclosure, these extents in the logic space of the mapped RAID are referred to as RAID extent slice (abbreviated as "RES") or RAID stripe. As an example, the logic structure 200 illustrates a RAID stripe set 230 having M RAID stripes. For the sake of convenience, each RAID stripe is marked as RES (0) to RES (M-1). Each RAID stripe is mapped to a plurality of disk extents which may be selected from different storage disks 211 based on RAID policies (such as RAID level).

Only as an example, the logic structure 200 illustrates mapped RAID based on RAID 5. The data of each RAID stripe corresponds to five disk extents and each disk extent comes from a different storage disk 211. In other words, each RAID stripe is formed by mapping of the corresponding five disk extents. An abstract layer is introduced in the mapped RAID to describe the mapping relation between the RAID stripes and the disk extents. In the logic structure 200, the virtual disk set 220 is used to simulate the traditional RAID concept, including five virtual disks $220_1$ to $220_5$, and each virtual disk includes M virtual disk extents.

As an example, the logic structure 200 illustrates three RAID stripes RES (0), RES (1) and RES (2) of the mapped RAID with different patterns. Each RAID stripe is mapped to five virtual disk extents, for example, for RES (0), its corresponding virtual disk extents are {VE(0,0), VE(1,0), VE(2,0), VE(3,0), VE(4,0)}, respectively. Each virtual disk extent is mapped to a disk extent in the storage pool 210, for instance, VE(0,0) is mapped to DE(0,0). As such, RES (0) is mapped to {DE(0,0), DE(1,0), DE(2,0), DE(4,4), DE(n,4)}.

In the mapped RAID, when a storage disk fails, the plurality of RAID stripes involved in the storage disk will be affected and these affected RAID stripes need to be reconstructed. For each affected RAID stripe, an unused disk extent will be selected as a reconstruction destination and the data is reconstructed at the selected disk extent. Generally, a hot spare area will be provided in the storage pool as a spare extent for data reconstruction. For example, the hot spare area 212 in the storage pool 210 is provided at an end of the storage disk 211. It is to be understood that the hot spare area 212 may also be arranged at different positions of each storage disk 211.

Traditionally, when the data of mapped RAID is being reconstructed, a single storage processor is used to perform the operations in the logic order of the RAID stripes. It has been realized that when the single storage processor has a plurality of processing cores, it is possible to perform RAID stripe reconstruction concurrently.

Figure 3:
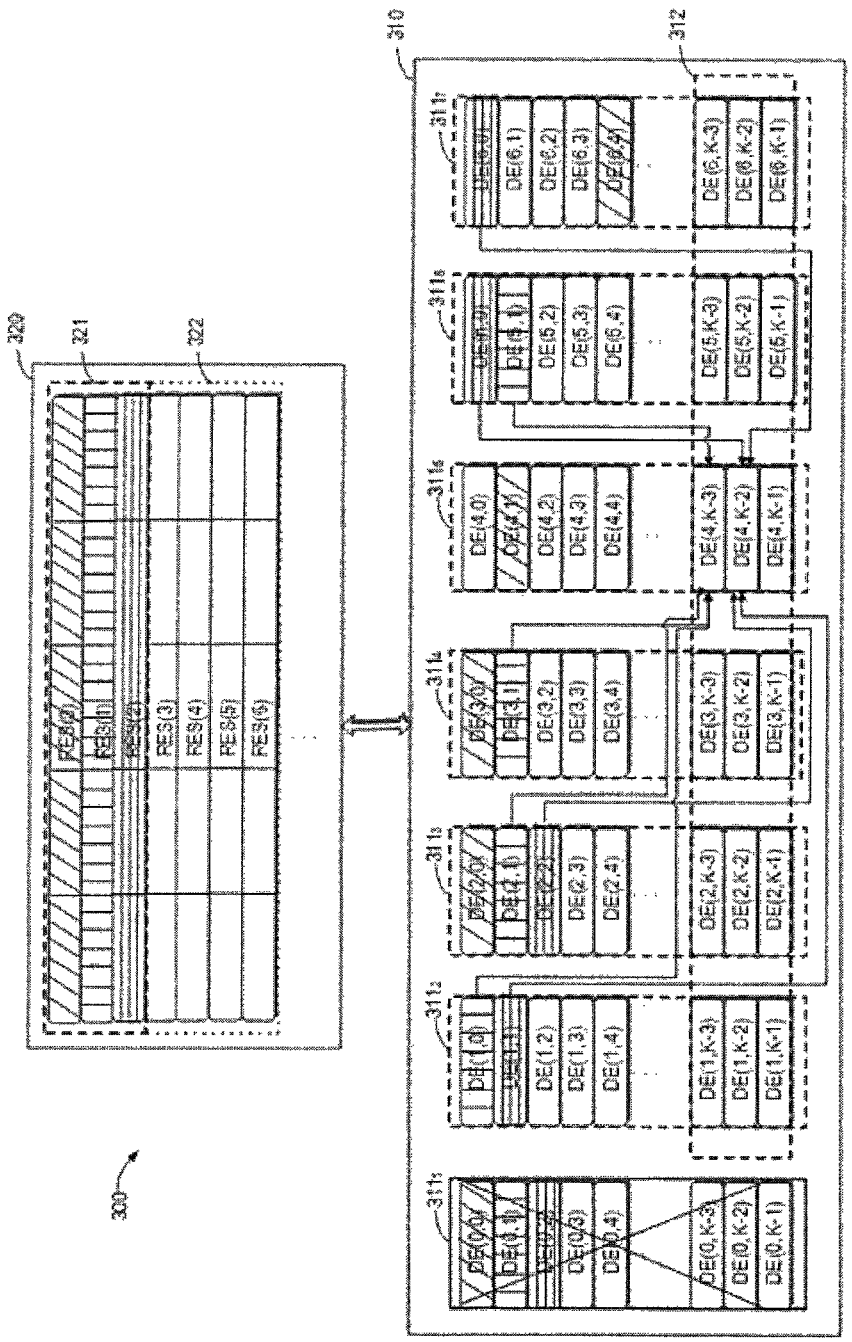
FIG. 3 is a schematic diagram of a reconstruction bottleneck generated by the concurrent implementations of reconstruction tasks.

FIG. 3 is a schematic diagram of a reconstruction bottleneck generated by the concurrent implementations of reconstruction tasks. As shown in the figure, assuming that the storage system supports concurrent reconstructions of three RAID stripes, the RAID stripe set 321 performing concurrently in order in the stripe set 321 includes RES (0), RES (1) and RES (2), while other RAID stripes to be reconstructed form, for instance, a to-be-reconstructed stripe set 322.

Assuming that the storage disk 311$_1$ fails, the RAID stripes mapped by all the disk extents on the disk should be reconstructed. For example, the RAID stripes RES (0), RES (1) and RES (2) mapped by DE (0, 0), DE (0, 1) and DE (0, 2) may be reconstructed concurrently by a certain storage processor. Since in the mapped RAID, the RAID stripe set has been distributed on each storage disk 311 in the storage pool 310. It is possible that the concurrently reconstructed RAID stripes are reconstructed on the same destination storage disk, leading to the fact that no concurrent processing is actually performed. For instance, RES (1) and RES (2) might be both reconstructed on the corresponding disk extents DE (4, K-3) and DE (4, K-2) on the storage disk 3113, causing a reconstruction bottleneck.

Different from the known scheme, embodiments of the present disclosure provide a solution for optimizing data reconstruction performance by improving the reconstruction process of the storage device and a solution of reconstructing mapped RAID data concurrently among the plurality of storage processors to further improve the reconstruction performance and efficiency.

In some embodiments of the present disclosure, the reconstruction of mapped RAID data is not performed in the logic order of RAID stripes in the logic space. Instead, the RAID stripes to be reconstructed and the corresponding spare disk extent to be used are determined by considering the I/O load state of different storage blocks in the mapped RAID multi-dimensionally so as to improve the reconstruction performance.

Figure 4:
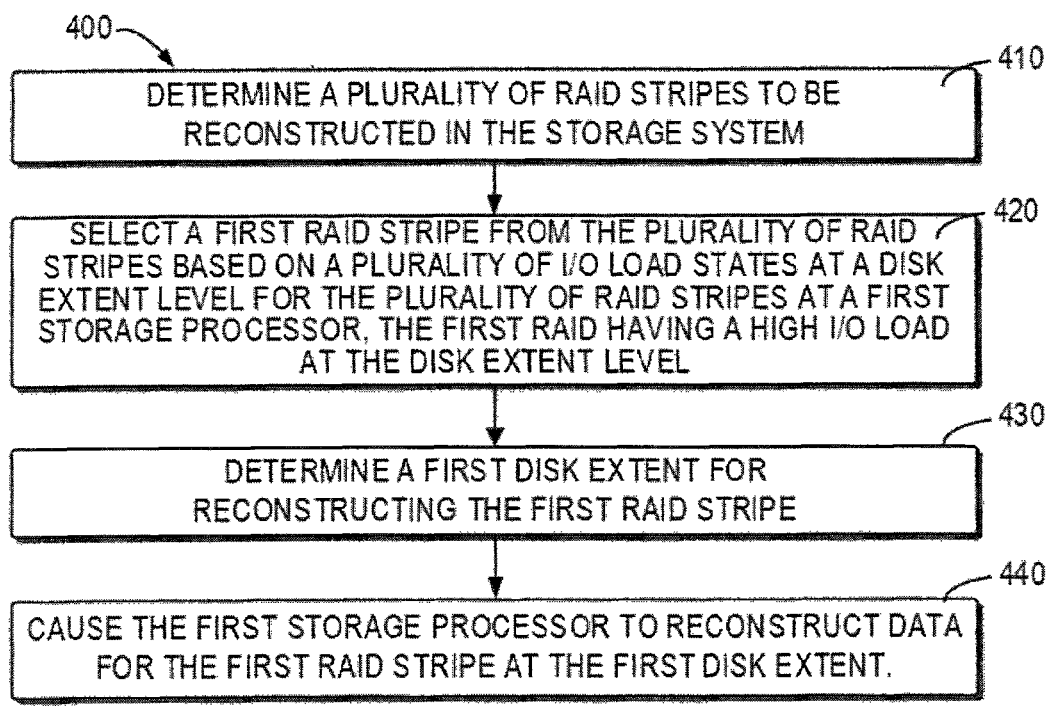
FIG. 4 is a flowchart illustrating a data reconstruction process in accordance with embodiments of the present disclosure.

In particular, FIG. 4 illustrates a data reconstruction process 400 in accordance with embodiments of the present disclosure, which can be implemented at a certain storage processor or at a scheduling apparatus for scheduling a reconstruction task in the storage environment 100. The scheduling apparatus may be arranged in any suitable place in the storage environment 100, for instance, it may be arranged in parallel with a certain storage processor.

At 410, a plurality of RAID stripes to be reconstructed in the storage system are determined. In the mapped RAID, when a certain storage disk fails, the data stored on the storage disk should be reconstructed and the disk extent that these data are located in is mapped to a plurality of RAID stripes. Therefore, all the RAID stripes to be reconstructed may be determined based on mapping relations recorded in the storage system.

At 420, for a certain storage processor, based on multiple I/O load states at the disk extent level for a plurality of RAID stripes at the storage processor, a RAID stripe (referred to as first RAID stripe) is selected from a plurality of RAID stripes, for the storage processor to reconstruct its data. The first RAID stripe has a higher I/O load at the disk extent level. By the storage processor having more I/O at the RAID stripe, it means that fewer lock conflicts with other I/Os are expected, so that it can improve the reconstruction performance.

In some embodiments, the first RAID stripe may be, among the plurality of RAIDs to be reconstructed, a RAID stripe that has the highest I/O load at the disk extent level among the plurality of RAID stripes for the storage processor, or has the I/O load at the disk extent level that is greater than a certain threshold, or has the I/O load state at the disk extent level indicating that it has a high-level I/O load.

In some embodiments, for the storage processor, one RAID stripe to be reconstructed may also be selected from the RAID stripes to be reconstructed based on the consideration of more factors. For example, it is further possible to consider the I/O load state at the disk level of the RAID stripe at the storage processor, and select the RAID stripe having a low I/O load at the disk level for the storage processor. In other words, the first RAID stripe may also be, among the plurality of RAIDs to be reconstructed, a RAID stripe that has the lowest I/O load at the disk level among a plurality of RAID stripes for the storage processor, or has the I/O load at the disk level that is smaller than a certain threshold, or has the I/O load state at the disk level indicating that it has a low-level I/O load, so that it is expected to complete reconstruction of the RAID stripe under the current I/O pressure within a shorter period of time.

In some embodiments, it is further possible to consider the I/O load state for a RAID stripe at the plurality of storage processors in the storage system. For example, the I/O load state at the disk level of the RAID stripe at each storage processor in the storage system is further considered and a RAID stripe having a low I/O load at the disk level for all the storage processors as a whole is selected, so that it is expected to complete reconstruction of the RAID stripe under the current I/O pressure within a shorter period of time.

It may be appreciated that the I/O load state of the respective storage extent block described herein statistically reflects the state of I/O requests in the storage system. According to an embodiment of the present disclosure, to represent the I/O load state of different storage areas in the mapped RAID, it is possible to use the disk extent (DE) as a fundamental unit to calculate the I/O requests. Each storage processor will record its I/O requests for the storage disks and count the number of the I/O requests on each disk extent.

Taking disk extent DE (0, 0) as an example, the number of I/O requests of the disk extent DE (0, 0) may be obtained at time $t_0$, which is represented as $i_0 = I/O_{count}(t_0, DE(0,0))$. At time $t_1$, the number of all the I/O requests of the disk extent DE (0, 0) is represented as $i_1 = I/O_{count}(t_1, DE(0,0))$, and then the number of I/O requests of disk extent DE (0, 0) during the period $\Delta t_1$ may be obtained: $\alpha_1 = I/O_{count}(\Delta t_1, DE(0,0)) = i_1 - i_0$, where $\Delta t_1 = t_1 - t_0$.

As an example, given the I/O statistics on each disk extent, the heat value of each disk extent may be calculated. It is assumed that a series of observed I/O requests on a specific storage disk in a continuous time period have been obtained, denoted by $\alpha_1, \alpha_2, \alpha_3, \ldots, \alpha_n$, where n is the set times of the history record. Then, the heat value H may be computed using the following equation (1).

$$H = \frac{\alpha_1 + \alpha_2 + \alpha_3 + \ldots + \alpha_n}{n} \quad (1)$$

It may be appreciated that the above equation (1) is only an example for calculating heat H using the arithmetic mean algorithm, which represents the average heat value of the previous n time periods. It is also possible to calculate heat H using other algorithms based on the number of recorded I/O requests, for instance, using variation rate, different weighting factors and the like.

At the disk extent pool layer, the heat value G of each storage disk may be calculated using the following equation (2).

$$G = H_1 + H_2 + \ldots H_d \quad (2)$$

where G represents the I/O load of the storage disk that a certain disk extent is located in, and has d disk extents.

At the mapped RAID layer, the heat value F of each RAID stripe may be calculated using the following equation (3):

$$F = H_{i1} + H_{i2} + \ldots H_{i2} \quad (3)$$

where F represents the I/O load at the disk extent level for the $i^{th}$ RAID stripe, where the $i^{th}$ RAID stripe is mapped to r disk extents.

At the mapped RAID layer, the heat value E of each RAID stripe may be calculated using the following equation (4).

$$E = G_{i1} + G_{i2} + \ldots G_{ir} \quad (4)$$

where E represents the I/O load at the disk extent for the $i^{th}$ RAID stripe, where the $i^{th}$ RAID stripe is mapped to r disk extents.

The above provides the specific examples of representing the I/O load states of different storage extent blocks in the mapped RAID. Each storage processor may maintain its records of heat value for each disk extent, each storage disk and each RAID stripe. It may be understood that the present disclosure does not intend to be limited to reflecting the I/O load state with the heat value represented in the above manner and other algorithms are also possible. For example, different weighting factors and averages may be used for calculation, or different I/O load levels (such as very high, higher, high, low) may be used to represent the I/O load states.

At 430, a disk extent (hereinafter referred to as first disk extent for ease of description) for reconstructing the first RAID stripe is determined. After the RAID stripe to be reconstructed in the first storage processor is determined, it is necessary to determine a spare disk extent for reconstructing data of the RAID stripe thereon.

For the first RAID stripe to be reconstructed, there exists a set of available storage disks. Each storage disk in the set does not conflict with the storage disk involved in the data of the RAID stripe and has at least one spare disk extent available as the spare disk extent for the RAID stripe. In some embodiments, it is possible to consider the I/O load state of each storage disk to determine the first disk extent. For example, the storage disk with a low I/O heat value is selected and a spare disk extent is selected from this storage disk as the disk extent to reconstruct the first RAID stripe, so that it is expected to complete reconstruction of the RAID stripe under the current I/O pressure within a shorter period of time.

In some embodiments, it is further possible to consider the available capacity of the storage disk, or more particularly, the number of available spare disk extents. For example, the number of available spare disk extents in each storage disk may be further considered and the storage disk with a greater number of available spare disk extents is selected on which a spare disk extent is selected as the disk extent to reconstruct the first RAID stripe, so as to make the distribution of spare disk extents as uniformly as possible.

At 440, the first storage processor is configured to reconstruct data for the first RAID stripe at the first disk extent. After the RAID stripe to be reconstructed and the corresponding disk extents are determined for the first storage processor, the first storage processor may be caused to implement the reconstruction task. In particular, the RAID data reconstruction process may be performed in a known manner, for instance, scheduling a traditional RAID library to complete the reconstruction task, which will not be repeated here.

The reconstruction process for a single RAID stripe for a certain storage processor in accordance with embodiments of the present disclosure has been described above with reference to FIG. 4. As stated above, when there are multiple storage processors in the storage system, it is also possible to make full use of the concurrent reconstruction process supported by the mapped RAID.

Figure 5:
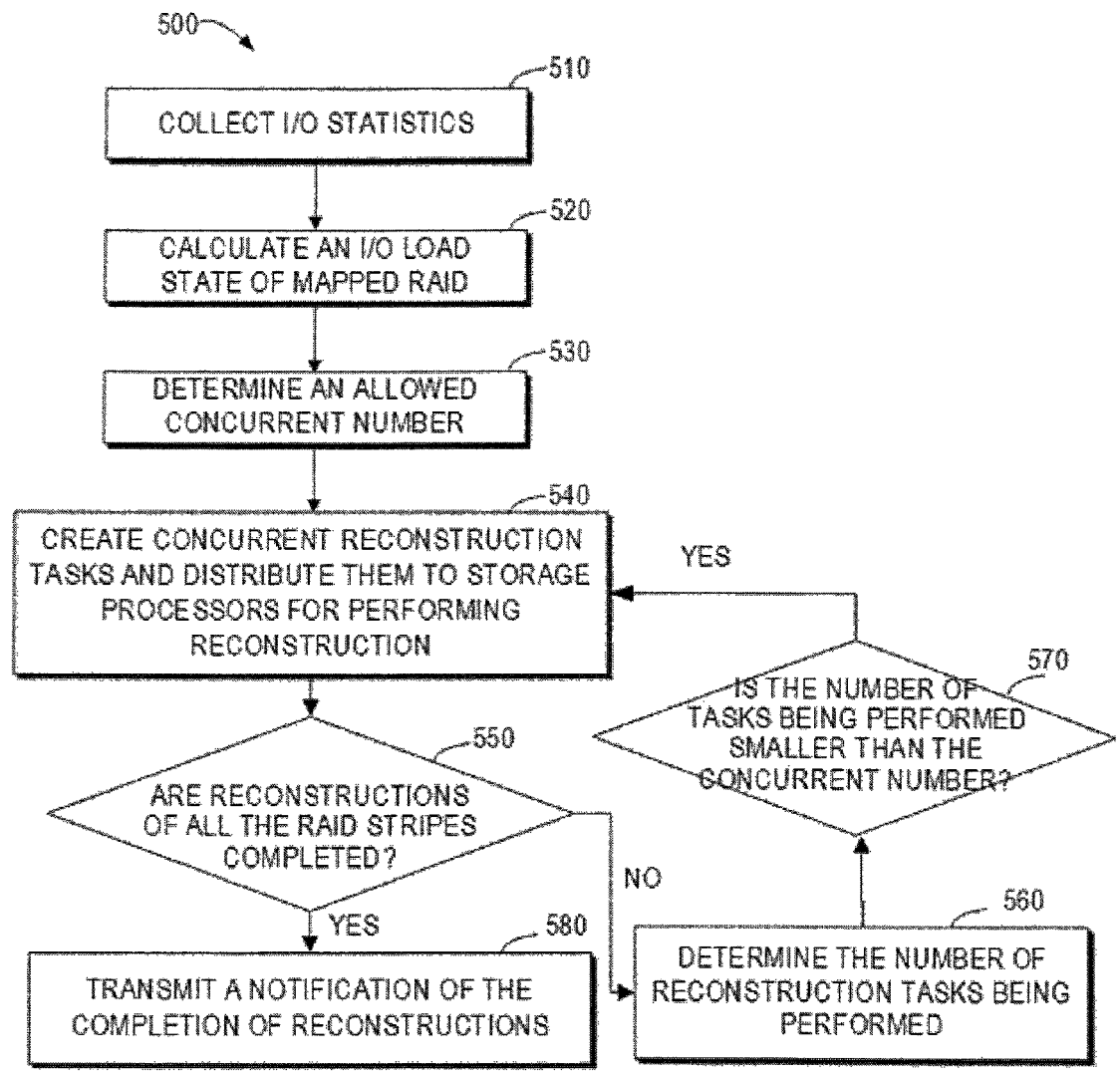
FIG. 5 is a flowchart illustrating a concurrent reconstruction process in accordance with embodiments of the present disclosure.

FIG. 5 illustrates a process 500 for reconstructing mapped RAID concurrently in accordance with embodiments of the present disclosure, which may be implemented at a scheduling apparatus for scheduling a reconstruction task in the storage environment 100. As stated above, the scheduling apparatus may be arranged at any suitable place in the storage environment 100, for instance, it may be arranged in parallel with a certain storage processor.

Illustratively, the storage system may collect the I/O statistics of the mapped RAID at 510, for example, the statistics of the I/O request data for each disk extent. At 520, based on the I/O statistics, it is possible to obtain the I/O load state for each disk extent and each RAID stripe at different levels of the mapped RAID, as stated above.

When it is detected that the reconstruction of data in the mapped RAID is needed, for instance, the scheduling apparatus may determine at 530 the number of concurrently reconstructed RAID stripes allowed by the current storage system. In accordance with embodiments of the present disclosure, it is advantageous to consider the current user I/O load. If the current user I/O load is very high, then the concurrent tasks for RAID data reconstruction should be relatively fewer; in contrast, if the current user I/O load is very low, more concurrent tasks may be applied, based on the consideration that the reconstruction of storage data should not affect user I/O too much. Besides, some other factors may be considered, such as the number of cores in each storage processor, the number of RAID stripes in the mapped RAID, and the width of the storage pool (namely, the number of storage disks).

As an example implementation, it is possible to determine the concurrent number C of reconstructing RAID stripes allowed by the current storage system based on the following equation (5):

$$C = \text{Function}(n, 2k, r, w) \quad (5)$$

where n represents the current user I/O load factor; k represents the number of cores of each storage processor; r is the number of RAID stripes in the mapped RAID to be reconstructed; and w is the width of the underlying storage pool.

According to an embodiment, the concurrent number may be determined based on C=min(n, 2k, r, w), that is, C is determined using the minimum function. As an example, n may be obtained with a predefined look up table. For example, for a particular mapped RAID, the following Table 1 may be obtained through experiments.

TABLE 1

| I/O load (percentage p) | | | | | |
| --- | --- | --- | --- | --- | --- |
| $p \leq p_1$ | $p_1 < p \leq p_2$ | $p_2 < p \leq p_3$ | $p_3 < p \leq p_4$ | $p_4 < p \leq p_5$ | $p > p_5$ |
| n | | | | | |
| $n_1$ | $n_2$ | $n_3$ | $n_4$ | $n_5$ | $n_6$ |

Here p is a percentage of the current user I/O load with respect to the I/O capacity of the storage system. According to practical experience, an optimized n value may be obtained. It may be appreciated that Table 1 is merely an example of the configurable predefined table depending on the real RAID system. Other ways may be used to represent the value of the current user I/O load factor n.

Referring back to FIG. 5, an adaptive method can be used for the process of using the above approach to determine the number of concurrent tasks for concurrent reconstructions of RAID data at 530. In other words, it is possible to adjust the concurrent number C adaptively based on the user I/O load change. For example, based on I/O statistics collected at 510, when the user I/O load changes and n value changes accordingly based on, for example, Table 1, the re-calculation and updating of C value may be triggered.

At 540, the scheduling apparatus creates, based on the concurrent number, a concurrent reconstruction task and assigns it to one or more storage processors. The reconstruction task at least indicates the RAID stripe to be reconstructed and the corresponding disk extents for reconstructing the RAID stripe so that the storage processor performs data reconstruction. The process of the scheduling apparatus scheduling a single task for a certain storage processor may operate like process 400. The process of scheduling a plurality of concurrent tasks for the plurality of storage processors will be described below in detail in conjunction with FIGS. 6, 7 and 8.

The scheduling apparatus monitors if the reconstruction of each RAID stripe is completed and determines at 550 if all the RAID stripes to be reconstructed have been reconstructed. If so, it will transmit at 580 a notification of the completion of reconstructions to the server, for instance. On the other hand, if it is determined at 550 that the reconstructions of all the RAID stripes to be reconstructed are not yet completed, then it determines at 560 the number of reconstruction tasks being performed.

At 570, it is determined if the number of tasks being performed is smaller than the allowed concurrent number determined at 530. If so, the scheduling apparatus creates more reconstruction tasks to reach the concurrent number allowed by the storage system so as to reconstruct mapped RAID more efficiently.

Figure 6:
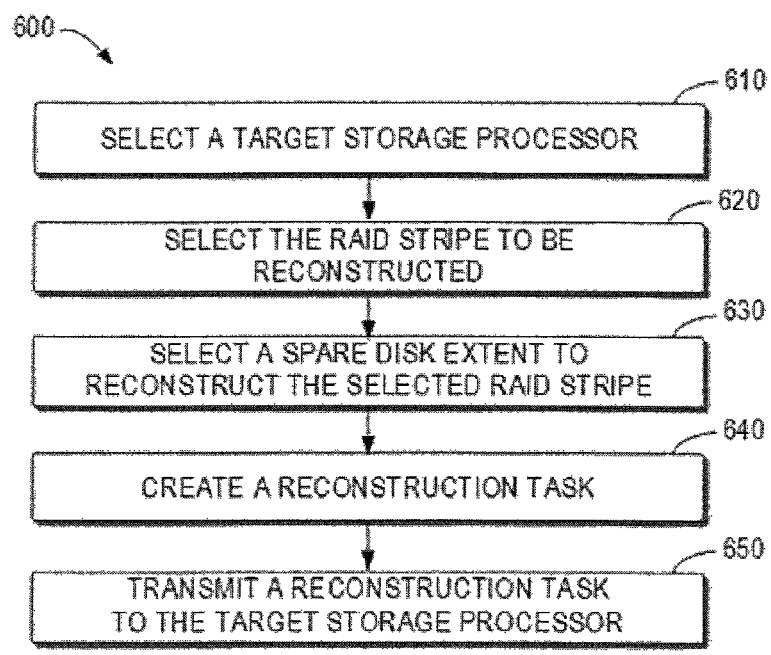
FIG. 6 is a flowchart illustrating a process of creating reconstruction tasks in accordance with embodiments of the present disclosure.

The process of scheduling the plurality of storage processors at 540 and creating reconstruction tasks for them described in FIG. 5 will be described in detail below with reference to FIG. 6. FIG. 6 illustrates a process of scheduling the plurality of storage processors and creating reconstruction tasks in accordance with embodiments of the present disclosure. At 610, the target storage processor is selected. According to embodiments of the present disclosure, the scheduling of the plurality of storage processors by the scheduling apparatus may be implemented using the polling method. Other policies may also be adopted to decide the manner of distributing tasks among the plurality of storage processors. For example, the processing load of each storage processor may be considered so that the reconstruction task can be assigned to each storage processor as uniformly as possible and the reconstruction of the mapped RAID can be completed as soon as possible.

At 620, the RAID stripe to be reconstructed is selected. The process of selecting RAID stripe when the plurality of storage processors perform reconstruction tasks concurrently will be described in detail below with reference to FIG. 7. Then, at 630, the scheduling apparatus selects a spare disk extent to reconstruct the selected RAID stripe at the target storage processor selected at 610. The process of selecting the spare disk extent when the plurality of storage processors perform reconstruction tasks concurrently will be described below in detail with reference to FIG. 8.

At 640, the scheduling apparatus creates a task to instruct the target storage processor to reconstruct the selected RAID stripe at the selected disk extent. Then, at 650, the created reconstruction task is transmitted to the target storage processor so that the target processor performs the RAID reconstruction.

Figure 7:
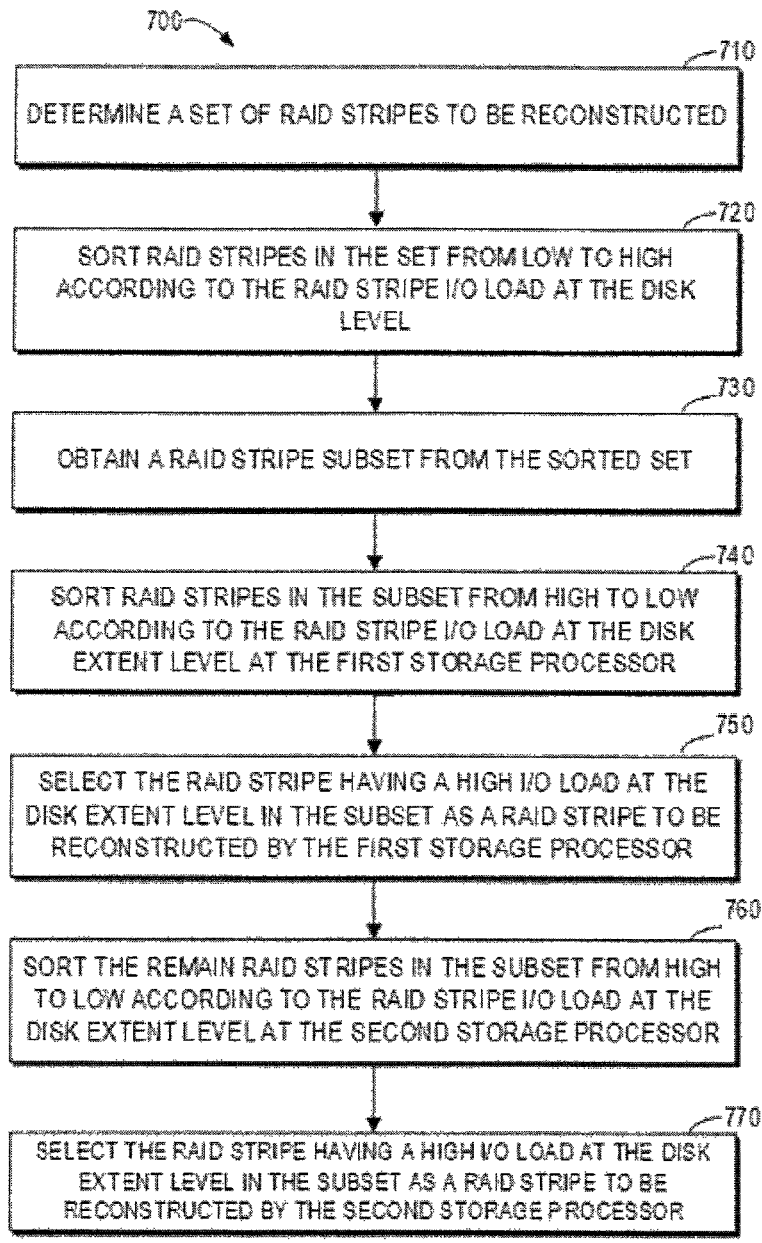
FIG. 7 is a flowchart illustrating a process of selecting a RAID stripe to be reconstructed for a plurality of storage processors in accordance with embodiments of the present disclosure.

FIG. 7 shows a specific implementation at 620 in FIG. 6. As stated above, each storage processor may maintain the records of the I/O load state (such as heat value) for each disk extent, each storage disk and each RAID stripe. The scheduling apparatus may collect such information from other storage processors for use in the decision of scheduling.

At 710, a set of RAID stripes to be reconstructed is determined, which is referred to as a set of RAID stripes. Then, at 720, RAID stripes in the set are sorted according to the RAID stripe I/O load at the disk level from low to high. The RAID stripe I/O load at the disk level may obtain the heat value D at the disk level of each RAID stripe, for instance, by adding the heat value E for each RAID stripe from s storage processors, where $D=E_1+E_2+ \ldots +E_s$. As an example, the RAID stripes in the set may be sorted according to the heat value D from low to high.

At 730, a first number (represented by Th_1) of RAID stripes are selected from the sorted set to obtain a subset of the RAID stripes. Th_1 is a configurable constant which is greater than the concurrent number C. In other words, a set of RAID stripes having low I/O loads at a plurality of storage processors at the disk level is selected from the sorted set.

Then, at 740, for the first target storage processor determined based on the scheduling policy, the selected Th_1 RAID stripes may be sorted from high to low according to the heat value F at the disk extent level in the first target storage processor.

Then, at 750, it is possible to select a RAID stripe having a high I/O load at the disk extent level in the subset as the RAID stripe to be reconstructed in the first target storage processor. In some embodiments, the selected RAID stripe has the highest F value in the subset, and alternatively, it may also be a RAID stripe in the subset having an F value greater than a certain threshold.

At 760, the remaining RAID stripes in the subset are sorted from high to low according to the heat value F at the disk extent level in the second target storage processor. Then, at 770, a RAID stripe having a high I/O load at the disk extent level may be selected in the subset as the RAID stripe to be reconstructed in the second storage processor. In some embodiments, the selected RAID stripe has the highest F value in the subset, and alternatively, it may also be a RAID stripe having an F value greater than a certain threshold in the subset.

It may be appreciated that if the scheduling apparatus selects a RAID stripe to be reconstructed for the processing memory, it will be marked as reconstructed and will not be selected twice. Similarly, with the above method, the scheduling apparatus may select the RAID stripes to be reconstructed by the selected target storage processor.

The process 700 performs the reconstruction task by firstly reconstructing the RAID stripe having lower heat and assigning suitable storage processors. In this way, with the RAID stripe having lower heat, it is expected to complete the reconstruction of the RAID stripe under the current I/O pressure within a shorter period of time. At the same time, the storage processor having more I/Os on the same RAID stripe is expected to have fewer lock conflicts with other I/Os so as to improve the reconstruction efficiency.

Figure 8:
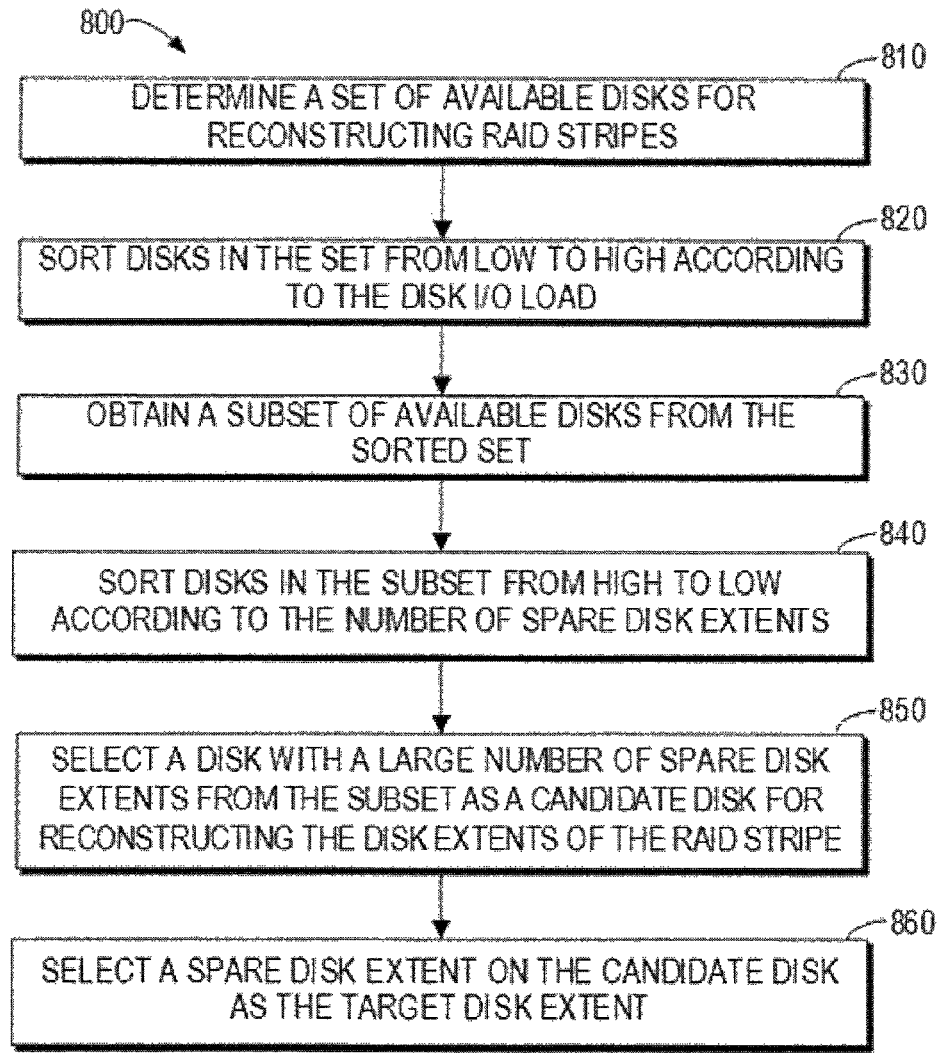
FIG. 8 is a flowchart illustrating a process for selecting a spare disk extent for a plurality of storage processors in accordance with embodiments of the present disclosure.

FIG. 8 shows a specific implementation at 630 shown in FIG. 6. At 810, a set of available disks is determined for the RAID stripe to be reconstructed selected for a certain storage processor. Each storage disk in the set does not conflict with the storage disk involved in the RAID stripe to be reconstructed and has at least one spare disk extent available as the spare disk extent for the RAID stripe.

At 820, the storage disks in the set may be sorted from low to high according to the I/O load of the storage disks. In an embodiment, the storage disks may be sorted according to the heat value G at the currently selected storage processor. At 830, a second number (represented by Th_2) of storage disks are selected from the sorted set to obtain a subset of available disks. Th_2 is a configurable constant which is greater than the concurrent number C. In other words, a set of disks having low I/O loads at the storage processor is selected from a plurality of disks available for reconstructing the RAID stripe.

At 840, the selected Th_2 storage disks may be sorted from high to low according to the number of spare disk extents. At 850, the disk with a large number of spare disk extents is selected from the subset as a candidate disk for reconstructing the disk extents of the RAID stripe. In some embodiments, the selected candidate disk is a disk in the subset with the highest number of spare disk extents, or with the number of spare disk extents that is greater than a certain threshold. At 860, the spare disk extent is selected in the candidate disk as the target disk extent.

It may be appreciated that if the scheduling apparatus selects a spare disk extent, it will be marked as used and will not be selected twice. Similarly, with the above method, the scheduling apparatus may select a corresponding spare disk extent for reconstructing the RAID stripe for the selected target storage processor.

The process 800 achieves selecting the most suitable spare disk extent for the reconstruction. First, a storage disk with a lower heat value is selected and a storage disk having more spare disk extents is selected. In this way, the storage disk having a lower heat is expected to complete reconstructions of RAID stripes under the current I/O pressure within a shorter period of time. At the same time, the storage disk having more spare disk extents is used firstly, which will maintain the distribution of spare disk extents as uniform as possible.

Figure 9:
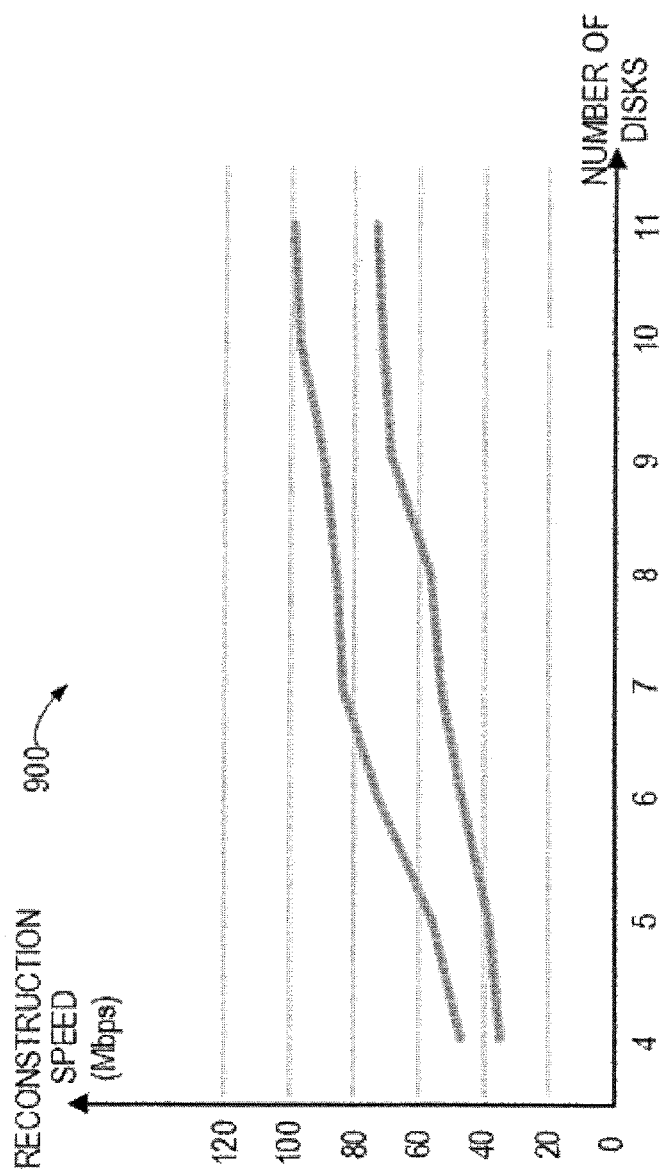
FIG. 9 illustrates a graph of the dual-storage-processor concurrent reconstruction performance in accordance with embodiments of the present disclosure as compared to traditional single-storage-processor reconstruction performance.

According to embodiments of the present disclosure, through the reconstruction scheme proposed herein, the reconstruction performance is improved. The conclusion is verified through a series of simulation and RAID tests. FIG. 9 shows a graph 900 illustrating dual-storage-processor concurrent reconstruction performance in accordance with embodiments of the present disclosure with respect to the traditional single-storage-processor reconstruction performance.

As illustrated, the horizontal axis represents the number of storage disks in the storage pool and the vertical axis represents the reconstruction performance under some fixed percent of I/O pressure, the performance being represented by the reconstruction speed (Mbps). The dual-storage-processor uses two storage processors for reconstruction and can be processed concurrently in each storage processor, thereby making full use of the bandwidth of the I/O path. Compared with performing reconstructions in the traditional order by a single storage processor, it can be seen that through performing reconstructions with dual storage processors according to embodiments of the present disclosure, the reconstruction performance is improved more notably as the number of storage disks increases.

Figure 10:
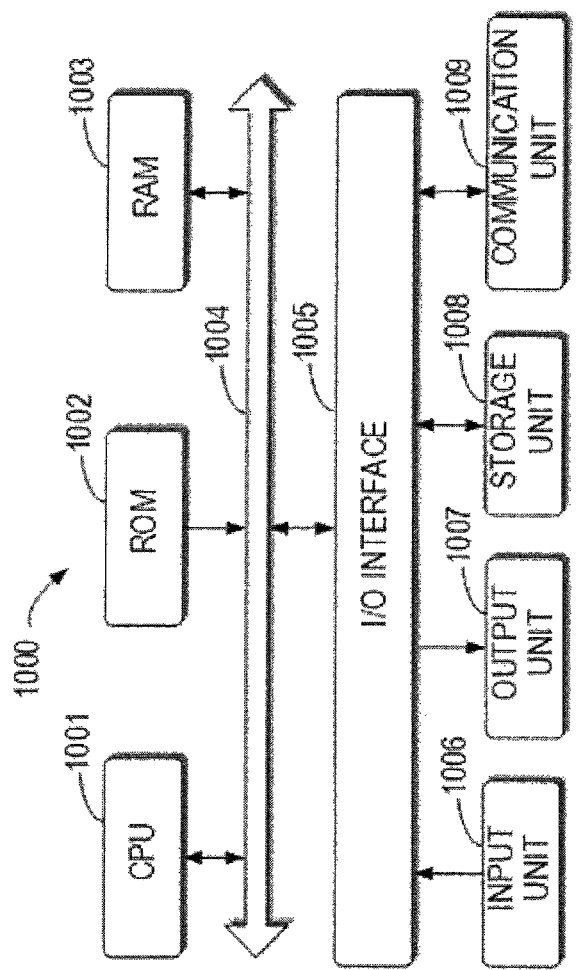
FIG. 10 is a schematic diagram illustrating a device in accordance with embodiments of the present disclosure.

FIG. 10 is a schematic diagram illustrating a device 1000 that can be used to implement embodiments of the present disclosure. As illustrated, the device 1000 includes a central processing unit (CPU) 1001 which can execute various suitable actions and processing based on the computer program instructions stored in a read-only memory (ROM) 1002 or the computer program instructions loaded into a random access memory (RAM) 1003 from a storage unit 1008. The RAM 1003 also stores all kinds of programs and data required by operating the storage device 1000. CPU 1001, ROM 1002 and RAM 1003 are connected to each other via a bus 1004 to which an input/output (I/O) interface 1005 is also connected.

A plurality of components in the device 1000 are connected to the I/O interface 1005, including: an input unit 1006, such as keyboard, mouse and the like; an output unit 1007, such as various types of displays, loudspeakers and the like; a storage unit 1008, such as a magnetic disk, an optical disk and the like; and a communication unit 1009, such as a network card, a modem, a wireless communication transceiver and the like. The communication unit 1009 allows the device 1000 to exchange information/data with other devices through computer networks such as Internet and/or various telecommunication networks.

In some embodiments, the processing unit 1001 may be configured to implement each procedure and processing described above, such as the method or process 400, 500, 600, 700 and 800. For example, in some embodiments, the method or process 400, 500, 600, 700 and 800 may be implemented as computer software programs, which are tangibly included in a machine-readable medium, such as storage unit 1008. In some embodiments, the computer program can be partially or completely loaded and/or installed to the device 1000 via ROM 1002 and/or the communication unit 1009. When the computer program is loaded to RAM 1003 and executed by CPU 1001, one or more steps of the above described method or process 400, 500, 600, 700 and 800 are implemented.

Particularly, according to embodiments of the present disclosure, the process described above with reference to FIGS. 4 to 8 may be implemented as a computer program product which is tangibly stored on a non-transient computer readable medium and comprises machine executable instructions. The instructions, when executed, cause the device to perform aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random suitable combinations thereof. More specific examples (non-exhaustive list) of the computer-readable storage medium comprise: a portable computer disk, a hard disk, random-access memory (RAM), read-only memory (ROM), erasable programmable read-only memory (EPROM or flash), static random access memory (SRAM), portable compact disk read-only memory (CD-ROM), a digital versatile disk (DVD), memory stick, a floppy disk, a mechanical coding device, such as a punched card storing instructions or an emboss within a groove, and any random suitable combinations thereof. The computer-readable storage medium used herein is not interpreted as a transient signal per se, such as radio waves or other freely propagated electromagnetic waves, electromagnetic waves propagated through waveguide or other transmission medium (such as optical pulses passing through fiber-optic cables), or electric signals transmitted through electric wires.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages comprising object-oriented programming languages, such as Java, Smalltalk, C++ and so on, and conventional procedural programming languages, such as C language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

Through the above depiction and the teaching given by the drawings, many modifications and other implementations of the present disclosure described herein can be realized by those skilled in the art related to the present disclosure. Therefore, it is to be understood that the embodiments of the present disclosure are not limited to the specific embodiments disclosed herein and the modifications and other implementations aim to be included in the scope of the present disclosure. Furthermore, though the above depiction and related drawings describe the example embodiments under the context of some example combinations of components and/or functions, it shall be realized that alternative embodiments provide different combinations of components and/or functions without departing from the scope of the present disclosure. In this respect, for example, other forms of combinations of components and/or functions different from those described explicitly above are also expected to be included in the scope of the present disclosure. Although specific terms are employed here, they are used in a general and descriptive sense rather than for limiting purpose.

We claim:

1. A method of managing a storage system, comprising:
   determining a plurality of RAID stripes to be reconstructed in a mapped RAID in the storage system;
   selecting a first RAID stripe of the mapped RAID from the plurality of RAID stripes based on a plurality of I/O load states at a disk extent level for the plurality of RAID stripes at a first storage processor in the storage system, the first RAID stripe having a high I/O load at the disk extent level;
   determining a first disk extent for reconstructing the first RAID stripe; and
   causing the first storage processor to reconstruct data for the first RAID stripe at the first disk extent, the first disk extent becoming part of the mapped RAID in place of the first RAID stripe.

2. The method according to claim 1, wherein the storage system includes a plurality of storage processors, and wherein reconstruction of the first RAID stripe by the first storage processor at the first disk extent is performed concurrently with reconstruction of a second RAID stripe by a second storage processor at a second disk extent.

3. The method according to claim 2, wherein selecting the first RAID stripe comprises:
   selecting, from the plurality of RAID stripes, a first set of RAID stripes having a low I/O load at a disk level at the plurality of storage processors; and
   selecting the first RAID stripe from the first set of RAID stripes.

4. The method according to claim 2, further comprising:
   determining an allowed concurrent number for reconstructing the plurality of RAID stripes concurrently based on at least one of the following: a current user I/O load, the number of cores in the plurality of storage processors, the number of the plurality of RAID stripes, and the number of disks in the storage system.

5. The method of claim 4, further comprising adaptively adjusting the allowed concurrent number for reconstructing the plurality of RAID stripes based on I/O load changes.

6. The method according to claim 2, further comprising:
   obtaining an I/O load state at the plurality of storage processors from the plurality of storage processors, the I/O load state including at least one of the following: a plurality of I/O load states at a disk level for the plurality of RAID stripes, a plurality of I/O load states at a disk extent level for the plurality of RAID extents, and a plurality of I/O load states for a plurality of disks in the storage system.

7. The method according to claim 1, wherein determining the first disk extent comprises:
   selecting, from a plurality of disks in the storage system available for reconstructing the first RAID stripe, a first set of disks having a low I/O load at the first storage processor;

selecting, from the first set of disks, a disk having a high available capacity as a candidate disk for reconstructing the first RAID stripe; and selecting, from the candidate disk, an available disk extent as the first disk extent.

8. The method of claim 1, wherein the mapped RAID is provided in a RAID-5 configuration.

9. An electronic device, comprising:
a processor; and
a memory having instructions stored thereon, the instructions, when executed by the processor, causing the device to perform acts comprising:
determining a plurality of RAID stripes to be reconstructed in a mapped RAID in a storage system;
selecting a first RAID stripe of the mapped RAID from the plurality of RAID stripes based on a plurality of I/O load states at a disk extent level for the plurality of RAID stripes at a first storage processor in the storage system, the first RAID stripe having a high I/O load at the disk extent level;
determining a first disk extent for reconstructing the first RAID stripe; and
causing the first storage processor to reconstruct data for the first RAID stripe at the first disk extent, the first disk extent becoming part of the mapped RAID in place of the first RAID stripe.

10. The device according to claim 9, wherein the storage system includes a plurality of storage processors, and wherein reconstruction of the first RAID stripe by the first storage processor at the first disk extent is performed concurrently with reconstruction of a second RAID stripe by a second storage processor at a second disk extent.

11. The device according to claim 10, wherein selecting the first RAID stripe comprises:
selecting, from the plurality of RAID stripes, a first set of RAID stripes having a low I/O load at a disk level at the plurality of storage processors; and
selecting the first RAID stripe from the first set of RAID stripes.

12. The device according to claim 10, wherein the acts further comprise:
determining an allowed concurrent number for reconstructing the plurality of RAID stripes concurrently based on at least one of the following: a current user I/O load, the number of cores in the plurality of storage processors, the number of the plurality of RAID stripes, and the number of disks in the storage system.

13. The device according to claim 10, wherein the acts further comprise:
obtaining an I/O load state at the plurality of storage processors from the plurality of storage processors, the I/O load state including at least one of the following: a plurality of I/O load states at a disk level for the plurality of RAID stripes, a plurality of I/O load states at a disk extent level for the plurality of RAID extents, and a plurality of I/O load states for a plurality of disks in the storage system.

14. The device according to claim 9, wherein determining the first disk extent comprises:
selecting, from a plurality of disks in the storage system available for reconstructing the first RAID stripe, a first set of disks having a low I/O load at the first storage processor;
selecting, from the first set of disks, a disk having a high available capacity as a candidate disk for reconstructing the first RAID stripe; and selecting, from the candidate disk, an available disk extent as the first disk extent.

15. A non-transitory, computer-readable storage medium having computer readable instructions stored thereon, the computer readable instructions, when executed, causing a device to perform acts comprising:
determining a plurality of RAID stripes to be reconstructed in a mapped RAID in a storage system;
selecting a first RAID stripe of the mapped RAID from the plurality of RAID stripes based on a plurality of I/O load states at a disk extent level for the plurality of RAID stripes at a first storage processor in the storage system, the first RAID stripe having a high I/O load at the disk extent level;
determining a first disk extent for reconstructing the first RAID stripe; and
causing the first storage processor to reconstruct data for the first RAID stripe at the first disk extent, the first disk extent becoming part of the mapped RAID in place of the first RAID stripe.

16. The non-transitory, computer-readable storage medium according to claim 15, wherein the storage system includes a plurality of storage processors, and wherein reconstruction of the first RAID stripe by the first storage processor at the first disk extent is performed concurrently with reconstruction of a second RAID stripe by a second storage processor at a second disk extent.

17. The non-transitory, computer-readable storage medium according to claim 16, wherein selecting the first RAID stripe comprises:
selecting, from the plurality of RAID stripes, a first set of RAID stripes having a low I/O load at a disk level at the plurality of storage processors; and
selecting the first RAID stripe from the first set of RAID stripes.

18. The non-transitory, computer-readable storage medium according to claim 16, wherein the acts further comprise:
determining an allowed concurrent number for reconstructing the plurality of RAID stripes concurrently based on at least one of the following: a current user I/O load, the number of cores in the plurality of storage processors, the number of the plurality of RAID stripes, and the number of disks in the storage system.

19. The non-transitory, computer-readable storage medium according to claim 16, wherein the acts further comprise:
obtaining an I/O load state at the plurality of storage processors from the plurality of storage processors, the I/O load state including at least one of the following: a plurality of I/O load states at a disk level for the plurality of RAID stripes, a plurality of I/O load states at a disk extent level for the plurality of RAID extents, and a plurality of I/O load states for a plurality of disks in the storage system.

20. The non-transitory, computer-readable storage medium according to claim 15, wherein determining the first disk extent comprises:
selecting, from a plurality of disks in the storage system available for reconstructing the first RAID stripe, a first set of disks having a low I/O load at the first storage processor;
selecting, from the first set of disks, a disk having a high available capacity as a candidate disk for reconstructing the first RAID stripe; and selecting, from the candidate disk, an available disk extent as the first disk extent.

* * * * *